United States Patent
Wang et al.

(10) Patent No.: US 12,041,485 B2
(45) Date of Patent: Jul. 16, 2024

(54) MANAGEMENT OF BACKHAUL BEARER FOR CONTROL PLANE SIGNALING TRANSMISSIONS

(71) Applicant: ZTE Corporation, Guangdong (CN)

(72) Inventors: Mengzhen Wang, Guangdong (CN); Lin Chen, Guangdong (CN)

(73) Assignee: ZTE Corporation, Shenzhen (CN)

( * ) Notice: Subject to any disclaimer, the term of this patent is extended or adjusted under 35 U.S.C. 154(b) by 343 days.

(21) Appl. No.: 17/486,768

(22) Filed: Sep. 27, 2021

(65) Prior Publication Data
US 2022/0070732 A1    Mar. 3, 2022

Related U.S. Application Data (63) Continuation of application No. PCT/CN2019/080208, filed on Mar. 28, 2019.

(51) Int. Cl.
*H04W 28/086*    (2023.01)
*H04W 76/12*    (2018.01)

(52) U.S. Cl.
CPC ......... *H04W 28/086* (2023.05); *H04W 76/12* (2018.02)

(58) Field of Classification Search
CPC ........................... H04W 28/086; H04W 76/12
See application file for complete search history.

(56) References Cited

U.S. PATENT DOCUMENTS

| | | | | |
|---|---|---|---|---|
| 11,412,519 B2* | 8/2022 | Malkamäki | ........... | H04W 76/11 |
| 2021/0377805 A1* | 12/2021 | Liu | ........ | H04W 72/21 |
| 2021/0378044 A1* | 12/2021 | Zhu | ........ | H04W 76/25 |
| 2022/0232651 A1* | 7/2022 | Wang | .................... | H04W 76/15 |

FOREIGN PATENT DOCUMENTS

WO    2019032885 A1    2/2019

OTHER PUBLICATIONS

Vietnamese office action issued in VN Patent Application No. 1-2021-06892, dated Aug. 31, 2023, 3 pages. English translation included.
International Preliminary Report on Patentability issued in International Patent Application No. PCT/CN2019/080208, dated Sep. 28, 2021, 5 pages.
International Search Report and Written Opinion mailed on Dec. 27, 2019 for International Application No. PCT/CN2019/080208, filed on Mar. 28, 2019 (7 pages).
ZTE et al., "Discussion on backhaul bearer setup in IAB network," 3GPP TSG-RAN WG3#102, Spokane, USA, R3-186419, 6 pages, Nov. 12-16, 2018.

(Continued)

*Primary Examiner* — Chandrahas B Patel
(74) *Attorney, Agent, or Firm* — Perkins Coie LLP (57) ABSTRACT

Methods, systems, and devices related to digital wireless communication, and more specifically, to techniques related to managing an integrated access backhaul (IAB) bearer for control plane signaling transmission. In one exemplary aspect, a method for wireless communication includes transmitting a first request including information controlling a backhaul bearer to a second network node. The method also includes receiving a first response from the second network node, the first response including the information controlling the backhaul bearer.

20 Claims, 5 Drawing Sheets

(56) References Cited

OTHER PUBLICATIONS

ZTE et al., "Discussion on BH RLC channel configuration in IAB network," 3GPP TSG RAN WG3 Meeting #103, Athens, Greece, R3-190546, 4 pages, Feb. 25-Mar. 1, 2019.
ZTE, "Discussion on UE bearer setup procedure for IAB network," 3GPP TSG-RAN WG2#103, Gothenburg, Sweden, R2-1812464, 5 pages, Aug. 20-24, 2018.
European Search Report for EP Patent Application No. 19921880.1, dated Oct. 6, 2022, 14 pages.
ZTE, "Consideration on user plane many-to-one bearer mapping," 3GPP TSG RAN WG2 Meeting #105, R2-1900563, Athens, Greece, Feb. 25-Mar. 1, 2019, 4 pages.
ZTE, "Discussion on user plane bearer mapping and comparison," 3GPP TSG-RAN WG2#103bis, R2-1814723, Chengdu, China, Oct. 8-12, 2018, 6 pages.
ZTE, "Consideration on control plane bearer mapping," 3GPP TSG RAN WG2 Meeting#105bis, R2-1904600, Xi'an, China, Apr. 8-12, 2019, 3 pages.
3GPP TS 38.473 version 15.8.0 Release 15, ETSI TS 138 473 V15.8.0 (Jan. 2020), 224 pages.
3GPP TS 38.473 version 16.3.1 Release 16, ETSI TS 138 473 V16.3.1 (Dec. 2020), 459 pages.
Chinese office action issued in CN Patent Application No. 201980096973.0, dated Apr. 21, 2023, 13 pages. English translation included.
Chinese office action issued in CN Patent Application No. 201980096973.0, dated Jan. 5, 2024, 12 pages. English translation included.
Korean office action issued in KR Patent Application No. 10-2021-7035220, dated Mar. 29, 2024, 6 pages. English translation included.

* cited by examiner

MANAGEMENT OF BACKHAUL BEARER FOR CONTROL PLANE SIGNALING TRANSMISSIONS

CROSS-REFERENCE TO RELATED APPLICATIONS

This application is a continuation of International Patent Application No. PCT/CN2019/080208, filed on Mar. 28, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to managing an integrated access backhaul (IAB) bearer for control plane signaling transmission.

In one exemplary aspect, a method for wireless communication includes transmitting a first request for information controlling a backhaul bearer to a second network node. The method also includes receiving a first response from the second network node, the first response including the information controlling the backhaul bearer.

In another exemplary aspect, a method for wireless communication includes receiving a configuration message from a second backhaul node, the configuration message including a bearer configuration including information controlling a backhaul bearer. The method also includes transmitting a configuration response message to the second backhaul node indicating that the first backhaul node established a backhaul bearer with the second backhaul node based on receiving the configuration message.

In another exemplary aspect, a method for wireless communication includes receiving a first request including information controlling a backhaul bearer from a donor backhaul node. The method also includes transmitting a first response including a bearer configuration that includes the information controlling the backhaul bearer to the donor backhaul node.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

This patent document describes techniques that can be implemented to manage an integrated access backhaul (IAB) bearer for control plane signaling. The present embodiments may provide techniques to transfer a control plane (CP) signaling messaging between a IAB node distributed unit (DU) and a donor central unit (CU) in a multi-hop relay backhaul link. The present embodiments may also provide techniques to manage a IAB bearer, which may include a backhaul RLC link configuration.

NR generally includes a larger available bandwidth relative to LTE, massive MIMO, etc. Also, in NR, the use of multiple beams may make it possible to utilize self-access backhaul links (e.g., an IAB link). With such wireless backhaul links and relay links, dense NR cell networks may be deployed without increasing a deployment of intensive transmission networks.

Figure 1:
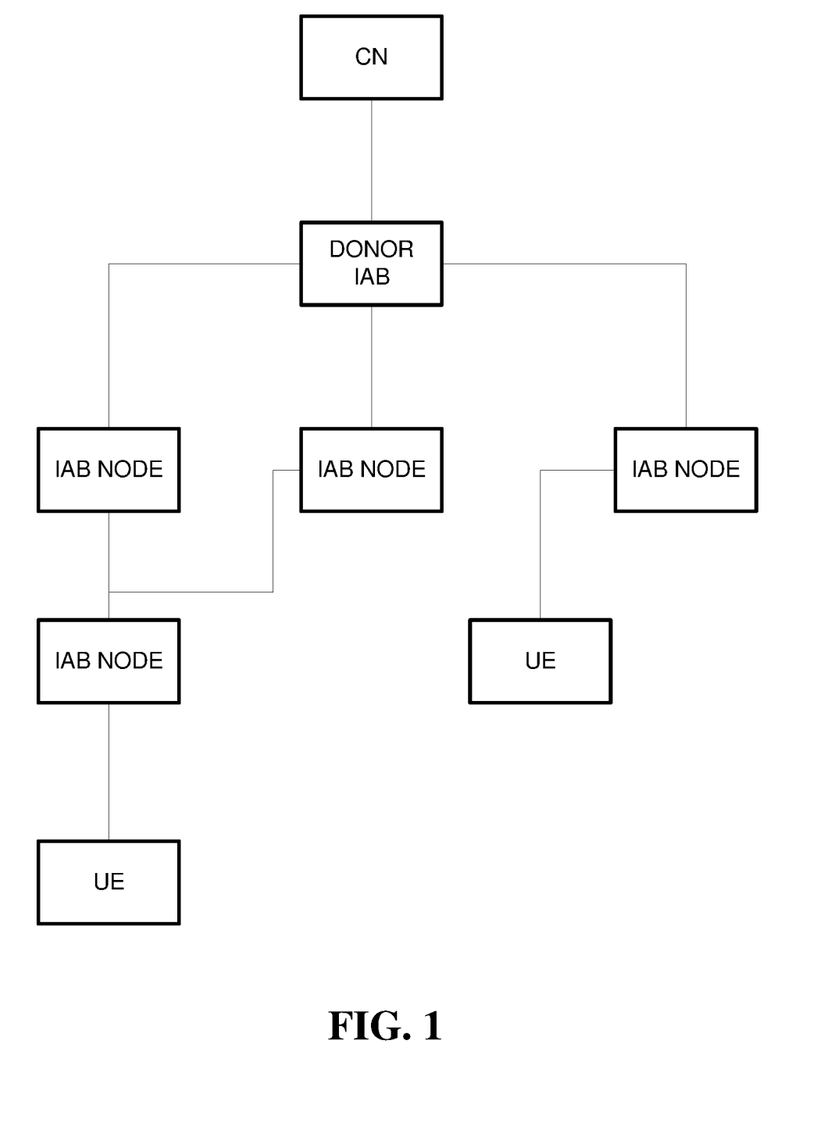
FIG. 1 illustrates an example integrated access and backhaul link environment.

FIG. 1 illustrates an example integrated access and backhaul link environment. An access node may support wireless access of a UE, and the access node may return a user plane packet or control plane signaling message, where the access node may include an IAB node. Wireless backhaul may be provided for an IAB node such that communication between the UE and the core network may be performed by a IAB host node (e.g., a IAB donor or donor IAB). Between access nodes, user plane packets or control plane signaling messages can be transmitted via a wireless backhaul link. Access links and backhaul links can use the same or different carrier frequencies. In addition, the user plane packet or the control plane signaling message can be transmitted via a multi-hop relay backhaul link between the access node and a core network element, as shown in FIG. 1.

In some embodiments, NR may support the deployment of CU/DU separation, where a gNB may include both CU and DU logic functions. A donor IAB, as shown in FIG. 1, may include an IAB donor CU and an IAB donor DU. An IAB node may include at least one of a base station (BS) and a mobile terminal (MT). The BS, which may be referred to as the IAB node DU, may indicate that the IAB node can operate like a base station and provide radio access functionality to a UE. A "BS part" of an IAB may include a portion of an IAB node, including any components utilized in performing BS functionality. The MT functionality may include the IAB node acting like a mobile terminal, where the IAB node is controlled and scheduled by an IAN donor node or an upper IAB node. A "MT" part of an IAB node may include a portion of the IAB node, including any components utilized in the performance of MT functionality of the IAB node.

In some embodiments, the IAB network may transmit user plane data and control plane signaling messages across a multi-hop relay backhaul link. Either user plane data or control plane signaling message being transmitted across the multi-hop relay backhaul link, the appropriate backhaul bearer may be established in advance. The present embodiments may relate to managing backhaul bearer establishment and bearer mapping for transmission/forwarding control plane signaling messages between a IAB node and a donor CU.

A first IAB node (e.g., IAB node 1 210 in FIG. 2) can connect to an IAB donor through a parent node (e.g., Donor node 2). After a MT part of IAB node 1 connects to a network, IAB node 1 DU and donor CU may establish an F1 interface before IAB node 1 can serve another UE or IAB node. IAB node 1 DU and Donor CU F1 interface signaling message may include two main parts, one is non-UE associated F1 signaling, it used for the F1 interface management, system information transmission and paging/warning message transmission. The other main part may include UE associated F1 signaling for UE context management and RRC message transmission. Based on one control plane protocol stack architecture (e.g., CP alternative 4), before IAB node 1 DU and Donor CU F1 setup, the transmission network layer association (e.g., TNL association) should be established. The TNL association related messages can be regarded as non-UE associated signaling. To complete IAB node 1 DU F1 setup and to transmit F1 interface signaling messages, the corresponding backhaul bearer should be configured/established between IAB node 1 and the parent IAB node (IAB node 2), and all intermediate IAB nodes along the forwarding path.

Example Embodiment 1

Figure 2:
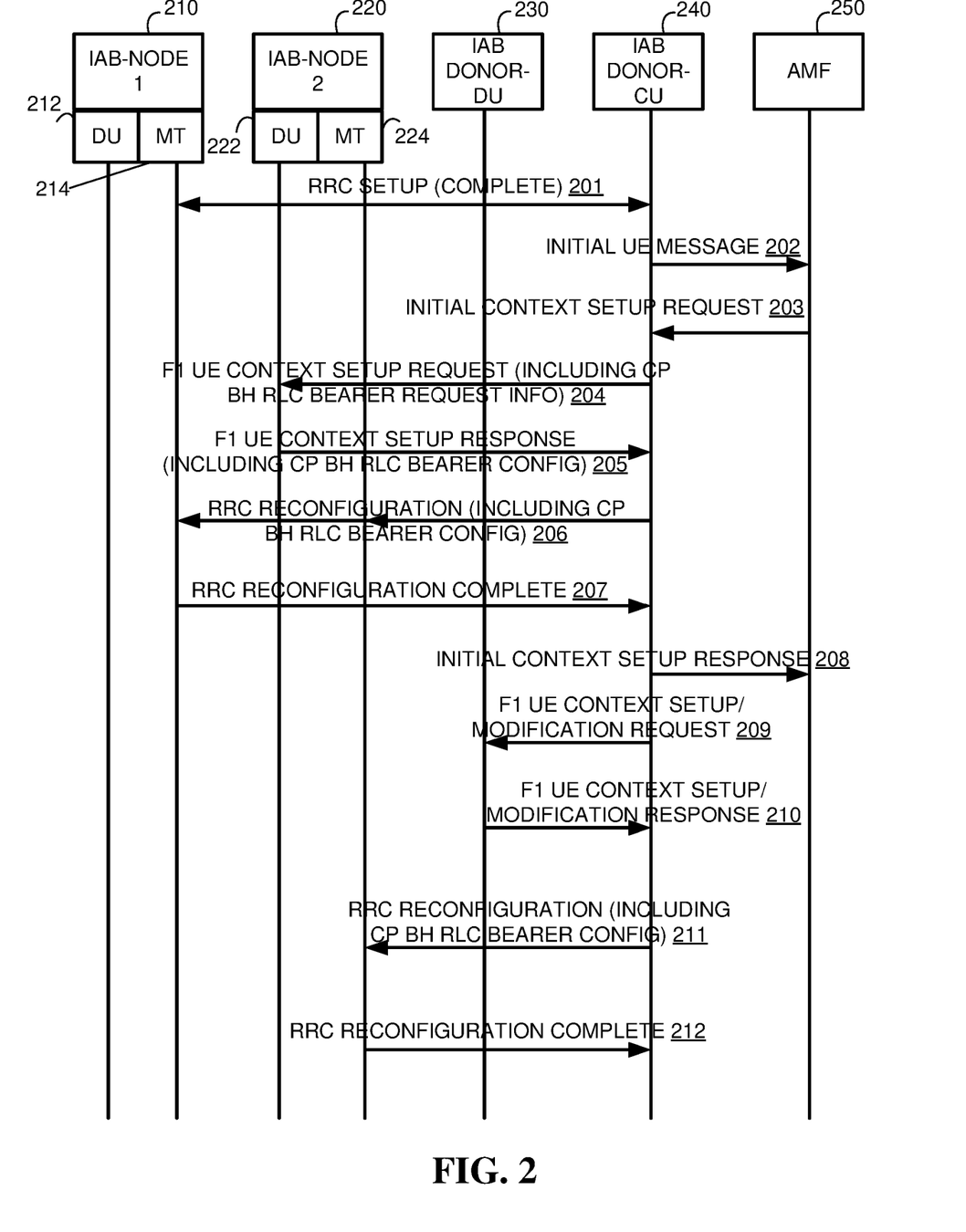
FIG. 2 is an example signaling process for backhaul RLC bearer setup/modification for control plane signaling transmission/forwarding.

FIG. 2 is an example signaling process for backhaul RLC bearer setup/modification for control plane signaling transmission/forwarding. As shown in step 201, the MT part 214 of IAB node 1 210 may perform radio resource control (RRC) setup procedure with an IAB Donor CU 240.

In step 202, after receiving RRC setup complete message from IAB node 1 MT 214, IAB donor CU 240 may transmit an initial UE context message to an AMF 250. In response, the AMF 250 may transmit an initial context setup request 202 to the IAB donor CU 240.

In step 204, the IAB donor CU 240 may transmit a UE context setup request message to a DU part 222 of IAB node 2 220. The UE context setup request may be transmitted over an F1 interface. The UE context setup request may include backhaul (BH) radio link control (RLC) bearer request information. BH RLC bearer also can be referred to as a BH bearer, a CP BH RLC channel, a BH RLC channel, etc. BH RLC bearer request information may include at least one of CP BH RLC bearer setup indication, a list of BH RLC bearer identities to be setup, a bearer type for each BH RLC bearer, and a set of bearer mapping rules. A bearer type may be any of: non-UE associated, UE associated, both non-UE associated and UE associated, shared, not shared, UE specific, and non-UE specific.

If a bearer type is non-UE associated/UE associated, the BH RLC bearer is used only for transmission non-UE associated Signaling/UE associated signaling. If the bearer type is both non-UE associated and UE associated bearer type, this indicates that the BH RLC bearer can be used to transmit non-UE associated and UE associated signaling. Shared/not shared bearer types may indicate whether the BH RLC bearer can share a control plane signaling message transfer for forwarding to another node (e.g., IAB node, UE). The UE specific/non-UE specific bearer type may indicate whether the BH RLC bearer is used to transmit control plane signaling messages for a specific IAB node/UE.

The IAB donor CU 240 may include CP BH RLC request bearer request information, where the information included in the UE context setup bearer message includes information received from IAB node 2 220. The bearer information may include at least one of a CP BH RLC bearer Setup indication, a list of BH RLC bearer identities to setup, a bearer type for each BH RLC bearer, and a set of bearer mapping rules. BH RLC Bearer ID might include at least one of a RLC channel ID, a logical channel ID, and a combination of IAB node MT/UE ID and RLC Channel ID/logical Channel ID.

A set of bearer mapping rules may include at least one of a message type to bearer type mapping, a mapping between DSCP and priority of BH RLC channel/RLC bearer/logical channel, an ingress bearer ID/priority/bearer type to egress bearer ID/priority/bearer type mapping, and a list of IAB node CP BH RLC channels/MT SRBs/UE SRBs that can be mapped to the CP BH RLC bearer. The message type to bearer type mapping may indicate, based on the message type (e.g., UE associated/non-UE associated), a mapping of transmitted message to the appropriate bearer type of BH RLC bearer on the transfer.

In step 205, the DU part 222 of the IAB node 2 220 may transmit a UE context setup response to the IAB donor CU over a F1 interface. The UE context setup response 205 may include CP BH RLC bearer configuration information. A BH RLC bearer configuration may include at least one of a list of failed bearer ID, a list of accepted bearer ID, an RLC mode, a bearer priority/logical channel priority, a logical channel ID, a logical channel group ID, an UL RLC configuration, a DL RLC configuration.

After receiving a CP BH RLC bearer information request, IAB node 2 220 may determine which CP BH RLC bearer is accepted or rejected and configured to accept the established CP BH RLC bearer. Through the UE context Setup process, the response message may include CP BH RLC bearer configuration to the IAB donor CU 240. CP BH RLC Bearer configuration information may include at least one of a list of failed bearer IDs, a list of accepted bearer ID, a RLC mode, a bearer priority/logic A1 Channel Priority, a logical Channel ID, a logical channel Group ID, a UL RLC config (sn-FieldLength, t-PollRetransmit, pollPDU, pollByte, maxRetxThreshold), and a DL RLC config (sn-FieldLength, t-Reassembly, t-StatusProhibit).

IAB donor CU 240 may receive CP BH RLC bearer configuration between IAB node 1 210 and IAB node 2 220. In transmitting the RRC reconfiguration message, the reconfiguration may be through DL RRC. The RRC reconfiguration message may include CP BH RLC bearer configuration information. After a message is transmitted to IAB node 2 220, IAB node 2 can transmit the RRC reconfiguration information to IAB node 1 210. Based on receiving the RRC reconfiguration information, IAB node 1 210 may establish a CP BH RLC bearer. In some embodiments, for an intermediate IAB node, the BH RLC bearer is mapped to the same bearer type that is sent to the next node that includes the bearer type of the received BH RLC bearer.

In step 206, the IAB donor CU 240 may transmit a RRC reconfiguration message to a MT part 214 of IAB node 1 210. The RRC reconfiguration massage may include BH RLC bearer configuration information. IAB node 1 210 may establish a backhaul RLC bearer for control plane signaling based on the RRC reconfiguration message. The RRC reconfiguration message may include at least one of a list of BH RLC bearer identity to be setup, a bearer type for each BH RLC bearer, bearer mapping rules, and a BH RLC bearer configuration. In particular, the RRC reconfiguration message may first be sent by donor CU to the parent IAB node of the IAB node MT via F1 DL RRC message transfer. The parent IAB node may decapsulate the RRC reconfiguration message from the F1 DL RRC message transfer and then send the RRC reconfiguration to the IAB node MT.

In step 207, the first IAB node 210 may transmit an RRC reconfiguration complete message to the IAB donor CU indicating that a connection is established with IAB node 2 220 based on the BH RLC bearer configuration info.

In step 208, the IAB donor CU 240 may transmit an initial context setup response to the AMF 250.

In step 209, a IAB donor CU 240 may transmit a UE context setup/modification request to the IAB donor DU 230. The donor CU 240 may determine whether an existing CP BH RLC bearer configuration or a new CP BH RLC bearer is needed to forward the control plane signaling message for forwarding to IAB Node 1 210 via the intermediate IAB node on the forwarding path. In this example, donor CU 240 further modifies/creates the CP BH RLC bearer between IAB Node 2 220 and donor DU 230 to forward the control plane signaling message for IAB node 1 210.

In step 210, the IAB donor DU 230 may transmit a UE context setup/modification response message over the F1 interface to IAB donor CU 240. Similar to the above steps, donor CU 240 sends CP BH RLC bearer request/modification info to SETUP/MODIFICATION Node 2 via UE context request IAB message. CP BH RLC Bearer modification info may be used to modify some configuration information for the BH RLC bearer in the previously configured CP BH RLC bearer request info. Donor DU 230 may modify or create a new CP BH RLC bearer configuration for IAB node 2 220 and sends it to donor CU 240.

In step 211, the IAB donor CU 240 may transmit a RRC reconfiguration message to the MT part 224 of IAB node 2 220. Donor CU 240 may assemble the RRC reconfiguration message and send it to IAB Node 2 220. IAB Node 2 220 may modify/establish CP BH RLC bearer for forwarding information to IAB Node 1 210 control plane signaling messages based on RRC reconfiguration information.

Example Embodiment 2

As mentioned in example embodiment 1, F1 signalling may be divided into non-UE associated F1 signalling and UE associated F1 signalling. In many cases, the priority of the non-UE associated F1 signalling is higher than UE associated F1 signalling. UE Associated F1 signalling may include two categories: UE context management and RRC message transfer. In some cases, UE context management message should also have a slightly higher priority. RRC message transfer may include SRB0,1,2,3 corresponding RRC signalling.

Depending on the default configuration of the SRB, SRB 0,1,3 may have the same priority, while the SRB2 priority may be lower than the other SRBs. For a many-to-one bearer mapping, the BH RLC channel can be divided into at least the following categories:

A BH RLC channel for DU non-UE associated F1 signalling, and a BH RLC channel for F1 AP messages for UE associated. BH RLC channel for UE associated F1AP messages can be further divided into BH RLC channel for UE context management F1AP messages and BH RLC channel for encapsulation of UE and MT RRC signalling. This can be further subdivided into several BH RLC channels according to the SRB0,1,2,3.

For a one-to-one bearer mapping, the BH RLC channel established by intermediate IAB nodes may be divided into multiple categories. A first category may include BH RLC channel for DU non-UE associated F1 signalling. This BH RLC channel may correspond to each access IAB node DU, creating a set of BH RLC Channels between access IAB node DU and IAB donor CU. A second category may include BH RLC channel for UE associated F1AP messages. Corresponding to each UE/IAB node MT to create/setup/establish 4 BH RLC channels (corresponding to SRB0, SRB1/3, SRB2, UE context management F1AP, respectively), or establish two BH RLC channels corresponding to each UE/IAB node MT (corresponding to SRBs and UE context F1AP messages, respectively, or to SRB0/1/3/UE context and SRB2, respectively).

For a BH RLC Channel created for the control signalling transmission, BH RLC channel configuration request information that donor CU send to DU (IAB node DU and donor DU) may include at least one of the following information: a BH RLC channel ID, CP BH RLC Channel indication or UP BH RLC channel indication (indicates that BH RLC channel is used for control plane signalling sending/forwarding or for user plane data transmission/forwarding); a BH RLC channel type (at least one of the following: non-UE associated F1AP, UE Associated F1AP, both UE associated and non-UE associated, SRB0/1/3, SRB2, etc); a priority of the BH RLC channel (which can be uniformly configured by donor CU); a duplication indication; a RLC Mode; a UE F1AP ID or UE F1AP ID list; a mapped DSCP; etc. IAB node DU and/or donor DU may send a response message to configure BH RLC channel to donor CU, the response message contains at least one of the following: the successfully created BH RLC channel index (if there is no BH RLC channel ID in the BH RLC channel configuration request information), BH RLC channel ID, corresponding logical channel ID, a primary path and a secondary path.

In addition to the configuration of the F1 interface as described above, the configuration of the RRC signalling may be considered for the establishment of the BH RLC channel of the IAB node MT. The configuration of the BH RLC channel can contain at least one of the following: a BH RLC channel ID, a CP BH RLC channel indication or uplink BH RLC channel INDICATION, a BH RLC Channel Type (at least one of the following: non-UE associated F1AP, UE Associated F1AP, SRB0/1/3, SRB2, etc), UE F1AP ID or UE F1AP ID list, a mapped DSCP, a RLC/Logical channel configuration, etc. In particular, the RRC reconfiguration message may first be sent by donor CU to the parent IAB node of the IAB node MT via F1 DL RRC message transfer. The parent IAB node may decapsulate the RRC reconfiguration message from the F1 DL RRC message transfer and then send the RRC reconfiguration to the IAB node MT.

Example Embodiment 3

In example embodiment 3, the donor CU may configure duplicate transmissions for UE/IAB node MT SRB. As noted in example embodiment 2, the donor CU may indicate DUPLICATION, and IAB node DU/donor DU may establish/configure the corresponding duplicated BH RLC channel and indicates which BH RLC channel is primary path and which is secondary path. In these embodiments, donor CU in the BH RLC channel setup request, for the BH RLC channel indicating duplication, further indicates at least one of the following: which Scell or carrier is used for primary path, which Scell/carrier is used for secondary path.

Example Embodiment 4

In example embodiment 4, under another control plane protocol stack architecture (CP Alternative 2), one or more new SRB for IAB node MT (for example, SRB4, SRB5) may be set up and used to map F1AP signalling to be forwarded. Here, the SRB configuration may be modified in the RRC signalling. For example, the RRC reconfiguration message sent by donor CU to IAB node MT may include at least one of the following: SRB ID, logical channel ID, a logical channel Priority, a bearer Type (non-UE Associated, UE associated, or both non-UE associated and UE associated), mapped DSCP, PDCP CONFIGURATION, RLC configuration, logical Channel Group ID, etc. In particular, the RRC reconfiguration message may first be sent by donor CU to the parent IAB node of the IAB node MT via F1 DL RRC message transfer. The parent IAB node may decapsulate the RRC reconfiguration message from the F1 DL RRC message transfer and then send the RRC reconfiguration to the IAB node MT.

Figure 3:
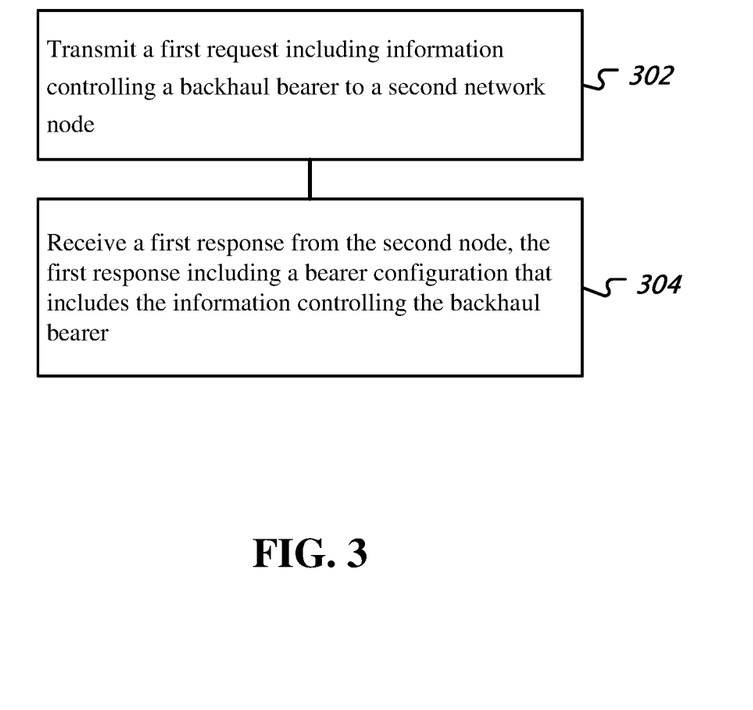
FIG. 3 illustrates a block diagram of a method to manage an integrated access backhaul (IAB) bearer for control plane signaling.

FIG. 3 illustrates a block diagram of a method to manage an integrated access backhaul (IAB) bearer for control plane signaling. A first network node may transmit a first request for information controlling a backhaul bearer to a second network node (block 302). The first network node may include an IAB donor node, such as IAB Donor CU 240 as described in FIG. 2, for example. The information controlling a backhaul bearer may include the CP BH RLC bearer request information as described in the present embodiments. The first request may include the UE context setup request as described in step 204 in example embodiment 1, for example.

The method also includes the first network node receiving a first response from the second network node, the first response including a bearer configuration including information controlling the backhaul bearer (block 304). The second node may include an IAB Node, such as IAB node 2 220 in FIG. 2. The first response may include the UE context setup response that includes the CP BH RLC bearer configuration information, as disclosed in step 205 in FIG. 2, for example.

In some embodiments, the information controlling the backhaul bearer in the first request includes information configuring a backhaul radio link control (RLC) bearer for control plane (CP) signaling transmissions.

In some embodiments, the information controlling the backhaul bearer in the first request includes a list of backhaul RLC bearer identifiers to be setup.

In some embodiments, the information controlling the backhaul bearer in the first request includes a bearer type for each backhaul RLC bearer.

In some embodiments, the information controlling the backhaul bearer in the first request includes a set of bearer mapping rules.

In some embodiments, the information controlling the backhaul bearer in the first request includes a carrier used for a primary path and/or a carrier used for a secondary path for a duplicated backhaul RLC bearer.

In some embodiments, the first request is transmitted to a distributed unit (DU) part of the second network node.

In some embodiments, the second network node is configured to transmit a configuration message to a third network node, the configuration message including the bearer configuration with the information controlling the backhaul bearer; and receive a configuration response from the third network node indicating that the third network node established a backhaul bearer with the second network node based on receiving the configuration message.

In some embodiments, the configuration message is received from the first network node, and wherein the second network node is configured to transmit the configuration message to a mobile terminal (MT) part of the third network node.

In some embodiments, the first network node is a central unit (CU) of a donor integrated access and backhaul link (IAB) node or a central unit of a split-architecture network, and the third network node is a IAB node, the second network node is a parent IAB node of the third network node.

In some embodiments, a method for wireless communication comprises receiving, by a first backhaul node, a configuration message from a second backhaul node, the configuration message including a bearer configuration including information controlling a backhaul bearer. The method also includes transmitting, by the first backhaul node, a configuration response message to the second backhaul node indicating that the first backhaul node established a backhaul bearer with the second backhaul node based on receiving the configuration message.

In some embodiments, the configuration message is received at a mobile terminal (MT) part of the first backhaul node.

In some embodiments, the configuration message is transmitted by a donor backhaul node.

In some embodiments, the bearer configuration includes a list of backhaul RLC bearer identifiers to be setup.

In some embodiments, the bearer configuration includes a bearer type for each backhaul RLC bearer.

In some embodiments, the bearer configuration includes a set of bearer mapping rules.

In some embodiments, the bearer type for each backhaul RLC bearer is one of a UE associated type, a non-UE associated type, or both a non-UE and UE associated type.

In some embodiments, the bearer type for each backhaul RLC bearer is a UE specific type or a non-UE specific type.

In some embodiments, the set of bearer mapping rules includes a mapping of a message type to a bearer type.

In some embodiments, the set of bearer mapping rules includes a mapping between a differentiated services code point (DSCP) and a priority of backhaul RLC bearer.

In some embodiments, the set of bearer mapping rules includes a mapping of a bearer type of ingress bearers to a bearer type of egress bearers.

In some embodiments, the method includes transmitting, by the first network node, a second request to a fourth network node, the second request including a request for updated information controlling the backhaul bearer; and receiving, by the first network node, a second response from the fourth network node, the second response including an updated bearer configuration that includes the updated information controlling the backhaul bearer.

In some embodiments, the fourth network node is a distributed unit (DU) of a IAB donor node or an intermediate IAB node.

In some embodiments, the method includes transmitting, by the fourth network node, a second configuration message to the second network node, the second configuration message including the updated bearer configuration with the updated information controlling the backhaul bearer; and receiving, by the fourth network node, a second configuration response from the second network node indicating that the second network node updated a backhaul bearer with the fourth network node.

In some embodiments, a method for wireless communication comprises receiving, by a distributed unit part of a first backhaul node, a first request including information controlling a backhaul bearer from a donor backhaul node.

The method also includes transmitting, by the distributed unit part of the first backhaul node, a first response including a bearer configuration that includes the information controlling the backhaul bearer to the donor backhaul node.

In some embodiments, the bearer configuration in the first response includes an indication of a primary path and/or a secondary path of a duplicated backhaul RLC bearer.

In some embodiments, the bearer configuration in the first response includes a list of accepted backhaul RLC bearer identifiers to be setup.

Figure 4:
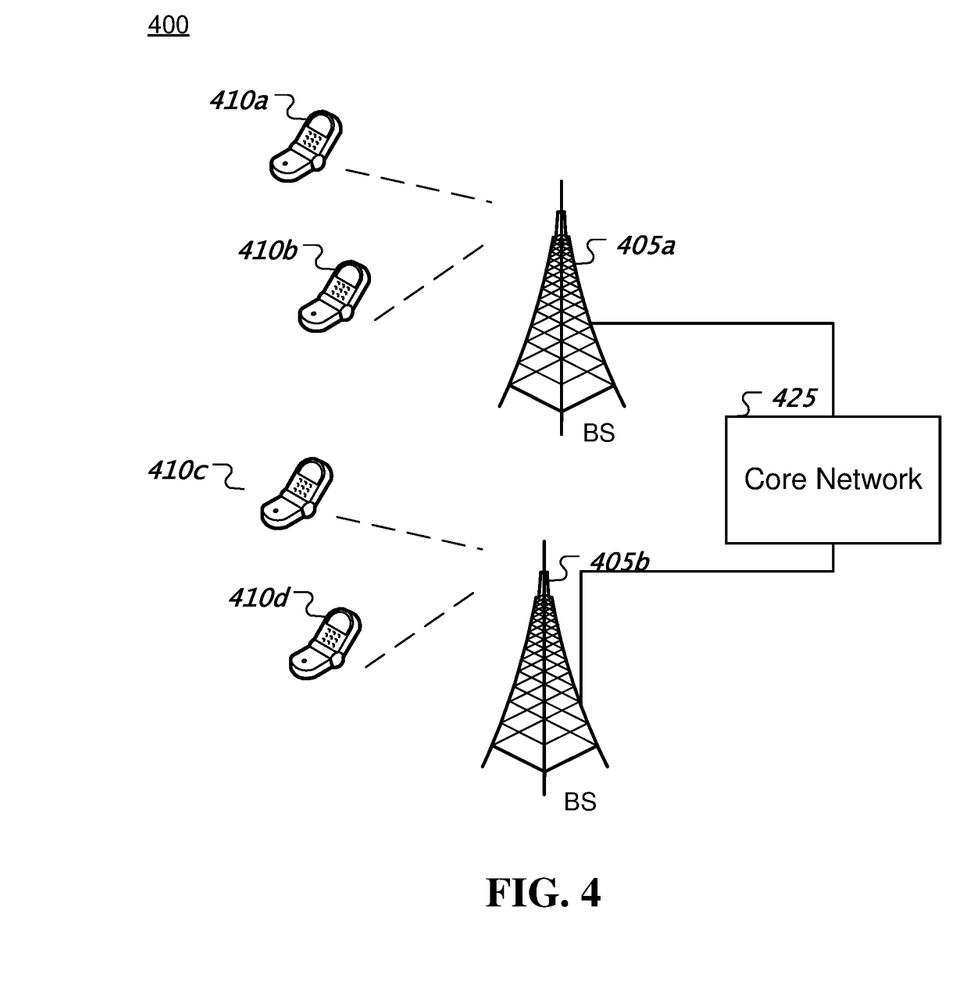
FIG. 4 shows an example of a wireless communication system where techniques in accordance with one or more embodiments of the present technology can be applied.

FIG. 4 shows an example of a wireless communication system where techniques in accordance with one or more embodiments of the present technology can be applied. A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies. In some embodiments, the base stations 405a, 405b may be configured to implement some techniques described in the present document. The wireless devices 410a to 410d may be configured to implement some techniques described in the present document.

In some implementations, a wireless communication system can include multiple networks using different wireless technologies. A dual-mode or multi-mode wireless device includes two or more wireless technologies that could be used to connect to different wireless networks.

Figure 5:
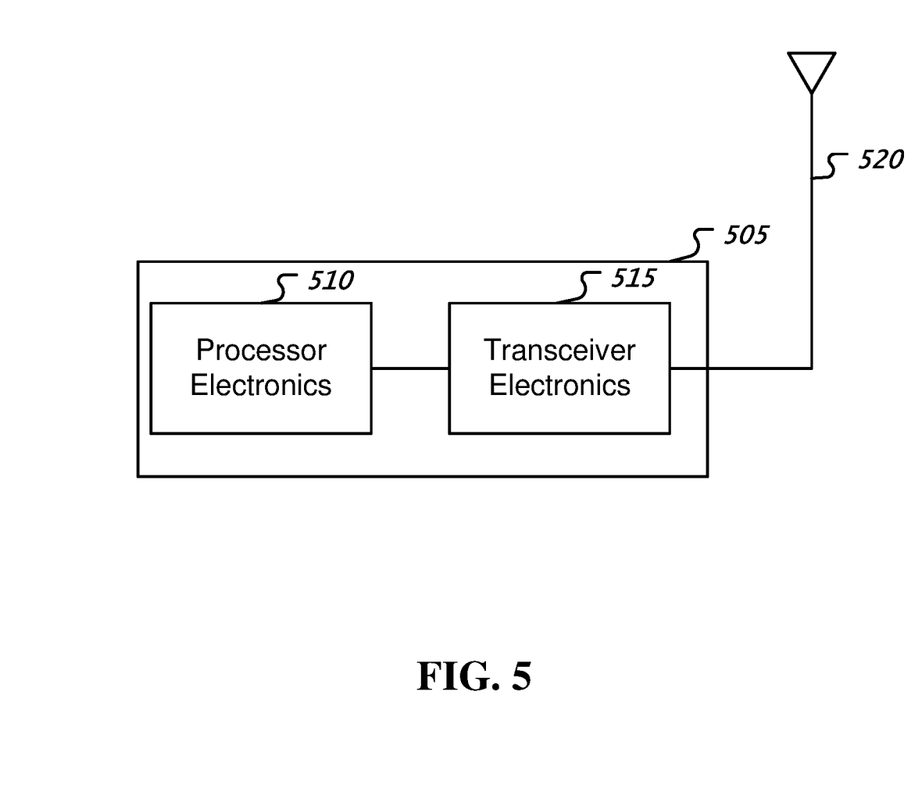
FIG. 5 is a block diagram representation of a portion of a hardware platform.

FIG. 5 is a block diagram representation of a portion of a hardware platform. A hardware platform 505 such as a network device or a base station or a wireless device (or UE) can include processor electronics 510 such as a microprocessor that implements one or more of the techniques presented in this document. The hardware platform 505 can include transceiver electronics 515 to send and/or receive wired or wireless signals over one or more communication interfaces such as antenna 520 or a wireline interface. The hardware platform 505 can implement other communication interfaces with defined protocols for transmitting and receiving data. The hardware platform 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions and network nodes (e.g., first to fourth network nodes described with reference to FIG. 2.) are implemented using the hardware platform 505.

It will be appreciated that the present document discloses techniques that may be used by embodiments to enhance operation of an integrated access backhaul carrier in the wireless network. For example, in some implementations, an IAB node may communicate with a parent IAB node to establish an RLC bearer. The IAB node may receive backhaul RLC bearer configuration information from the parent IAB node, and the IAB node may transmit an RRC reconfiguration message to the child IAB node. Based on the backhaul RLC bearer configuration information received in the RRC reconfiguration message, the child IAB node may establish an RLC bearer with the parent IAB node.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   transmitting, by a first network node, a first request including information controlling a backhaul bearer to a second network node, wherein the first request includes a backhaul radio link control (RLC) channel identifier that identifies a backhaul RLC channel, a priority of the backhaul RLC channel, a RLC mode, and a mapped differentiated services code point (DSCP); and
   receiving, by the first network node, a first response from the second network node, the first response including the information controlling the backhaul bearer, wherein the information controlling the backhaul bearer in the first request includes a list of backhaul RLC bearer identifiers to be setup.

2. The method of claim 1, wherein the information controlling the backhaul bearer in the first request includes information configuring a backhaul radio link control (RLC) bearer for control plane (CP) signaling transmissions.

3. The method of claim 1, wherein the first response received by the first network node includes a backhaul radio link control (RLC) channel that is successfully created which is identified by the backhaul RLC channel identifier.

4. The method of claim 1, further comprising:
   transmitting, by the first network node to the second network node, a backhaul radio link control (RLC) channel type that indicates a non-user equipment (UE) associated F1 application protocol (F1AP) or a user equipment (UE) associated F1 application protocol (F1AP).

5. The method of claim 1, wherein the mapped DSCP is associated with the backhaul RLC channel.

6. A method for wireless communication, comprising:
   receiving, by a distributed unit part of a first backhaul node, a first request including information controlling a backhaul bearer from a donor backhaul node, wherein the first request includes a backhaul radio link control (RLC) channel identifier that identifies a backhaul RLC channel, a priority of the backhaul RLC channel, a RLC mode, and a mapped differentiated services code point (DSCP); and
   transmitting, by the distributed unit part of the first backhaul node, a first response including the information controlling the backhaul bearer to the donor backhaul node, wherein the information controlling the backhaul bearer in the first request includes a list of backhaul RLC bearer identifiers to be setup.

7. The method of claim 6, wherein the information controlling the backhaul bearer in the first request includes information configuring a backhaul radio link control (RLC) bearer for control plane (CP) signaling transmissions.

8. The method of claim 6, wherein the first response transmitted by the distributed unit part of the first backhaul node includes a backhaul radio link control (RLC) channel that is successfully created which is identified by the backhaul RLC channel identifier.

9. The method of claim 6, further comprising:
receiving, by the distributed unit part of the first backhaul node from the donor backhaul node, a backhaul radio link control (RLC) channel type that indicates a non-user equipment (UE) associated F1 application protocol (F1AP) or a user equipment (UE) associated F1 application protocol (F1AP).

10. The method of claim 6, wherein the mapped DSCP is associated with the backhaul RLC channel.

11. A first network node comprising a processor configured to:
transmit a first request including information controlling a backhaul bearer to a second network node, wherein the first request includes a backhaul radio link control (RLC) channel identifier that identifies a backhaul RLC channel, a priority of the backhaul RLC channel, a RLC mode, and a mapped differentiated services code point (DSCP); and
receive a first response from the second network node, the first response including the information controlling the backhaul bearer, wherein the information controlling the backhaul bearer in the first request includes a list of backhaul RLC bearer identifiers to be setup.

12. The first network node of claim 11, wherein the information controlling the backhaul bearer in the first request includes information configuring a backhaul radio link control (RLC) bearer for control plane (CP) signaling transmissions.

13. The first network node of claim 11, wherein the first response received by the first network node includes a backhaul radio link control (RLC) channel that is successfully created which is identified by the backhaul RLC channel identifier.

14. The first network node of claim 11, wherein the processor is further configured to: transmit, to the second network node, a backhaul radio link control (RLC) channel type that indicates a non-user equipment (UE) associated F1 application protocol (F1AP) or a user equipment (UE) associated F1 application protocol (F1AP).

15. The first network node of claim 11, wherein the mapped DSCP is associated with the backhaul RLC channel.

16. A distributed unit part of a first backhaul node comprising a processor configured to:
receive a first request including information controlling a backhaul bearer from a donor backhaul node, wherein the first request includes a backhaul radio link control (RLC) channel identifier that identifies a backhaul RLC channel, a priority of the backhaul RLC channel, a RLC mode, and a mapped differentiated services code point (DSCP); and
transmit a first response including the information controlling the backhaul bearer to the donor backhaul node, wherein the information controlling the backhaul bearer in the first request includes a list of backhaul RLC bearer identifiers to be setup.

17. The distributed unit part of the first backhaul node of claim 16, wherein the information controlling the backhaul bearer in the first request includes information configuring a backhaul radio link control (RLC) bearer for control plane (CP) signaling transmissions.

18. The distributed unit part of the first backhaul node of claim 16, wherein the first response transmitted by the distributed unit part of the first backhaul node includes a backhaul radio link control (RLC) channel that is successfully created which is identified by the backhaul RLC channel identifier.

19. The distributed unit part of the first backhaul node of claim 16, wherein the processor is further configured to:
receive, from the donor backhaul node, a backhaul radio link control (RLC) channel type that indicates a non-user equipment (UE) associated F1 application protocol (F1AP) or a user equipment (UE) associated F1 application protocol (F1AP).

20. The distributed unit part of the first backhaul node of claim 16, wherein the mapped DSCP is associated with the backhaul RLC channel.

\* \* \* \* \*